United States Patent [19]

Maruo et al.

[11] Patent Number: 4,622,502
[45] Date of Patent: Nov. 11, 1986

[54] POSITION DETECTING APPARATUS

[75] Inventors: Tomohiro Maruo, Hirakata; Norio Okutani, Neyagawa; Toshitugu Inoue, Tsuzuki, all of Japan

[73] Assignee: Matsushita Electric Industrial Co., Ltd., Kadoma, Japan

[21] Appl. No.: 694,557

[22] PCT Filed: Apr. 23, 1984

[86] PCT No.: PCT/JP84/00210
§ 371 Date: Jan. 9, 1985
§ 102(e) Date: Jan. 9, 1985

[87] PCT Pub. No.: WO84/04586
PCT Pub. Date: Nov. 22, 1984

[30] Foreign Application Priority Data

May 17, 1983 [JP] Japan ................................. 58-87009
May 17, 1983 [JP] Japan ................................. 58-87011
Jul. 5, 1983 [JP] Japan ................................. 58-123060

[51] Int. Cl.⁴ .............................................. G05B 1/06
[52] U.S. Cl. ................................. 318/640; 318/480; 250/234; 250/578
[58] Field of Search ................ 318/640, 480; 250/234, 250/578

[56] References Cited

U.S. PATENT DOCUMENTS

3,457,422  7/1969  Rottmann ..................... 318/640 X
3,864,564  2/1975  Adkins ......................... 318/640 X
3,943,359  3/1976  Matsumoto et al. ........... 318/640 X
4,123,695 10/1978  Hale et al. .................... 318/640 X
4,352,984 10/1982  Ohara ............................. 250/234

Primary Examiner—B. Dobeck
Attorney, Agent, or Firm—Wenderoth, Lind & Ponack

[57] ABSTRACT

A position detecting apparatus provided with a lighting unit 13 for lighting an object 14 to be detected, an image-formation unit 15 for imaging the object 14, a detecting unit 16 comprising a plurality of photoelectric converters disposed on the image-formation plane to detect brightness of the image and disposed two-dimensionally, a scanning unit 17 for allowing the relative position of the image to the photoelectric converters to move one-dimensionally in the image-formation plane, a selecting unit 19 for selecting the plurality of detected signals of the detecting unit, and a decision means 18 for deciding the one- and two-dimensional positions of the center, corner and edge of the object by means of the detected signal of the detecting unit, a selected signal of the selecting unit and a scanning signal of the scanning unit, so that the images formed are moved slantwise with respect to the plurality of photoelectric converters disposed two-dimensionally and the selecting unit selects the detected signals and computing-processing them to carry out the one- and two-dimensional position detection of the center, corner and edge of the object.

8 Claims, 20 Drawing Figures

POSITION DETECTING APPARATUS

TECHNICAL FIELD

This invention relates to a position detecting apparatus for an industrial robot, and more particularly to a position detecting apparatus which carries out position detection by subtracting the respective detected signals of a plurality of photoelectric converters disposed two-dimensionally. This invention aims at providing a position detecting apparatus which enables one and two dimensional position detection to be carried out not only for the center of an object to be detected but also for an angle and an edge of the same, and also position detection in a wide range to be carried out in response to the size of the object to be detected.

BACKGROUND ART

When the industrial robot is used for work and the object is difficult to detect with accuracy, the position detecting apparatus is used for obtaining the position information of the object.

Generally, the position detecting apparatus employs an industrial camera, which requires a processing system of high computing function and often creates a problem in the manufacturing cost when in use. One method for position detection by a simplified processing system has been proposed, in which images of an object to be detected are image-formed on four photoelectric converters of $2 \times 2$ pcs. disposed two-dimensionally, and moved by a scanning unit slantwise of the disposal direction of the photoelectric converters so that two sets of detecting signals of the sum of outputs from two adjacent photoelectric converters are computed, whereby the one-dimensional scanning unit once scans the object to be detected so as to enable the two-dimensional position detection thereof.

Figure 1:
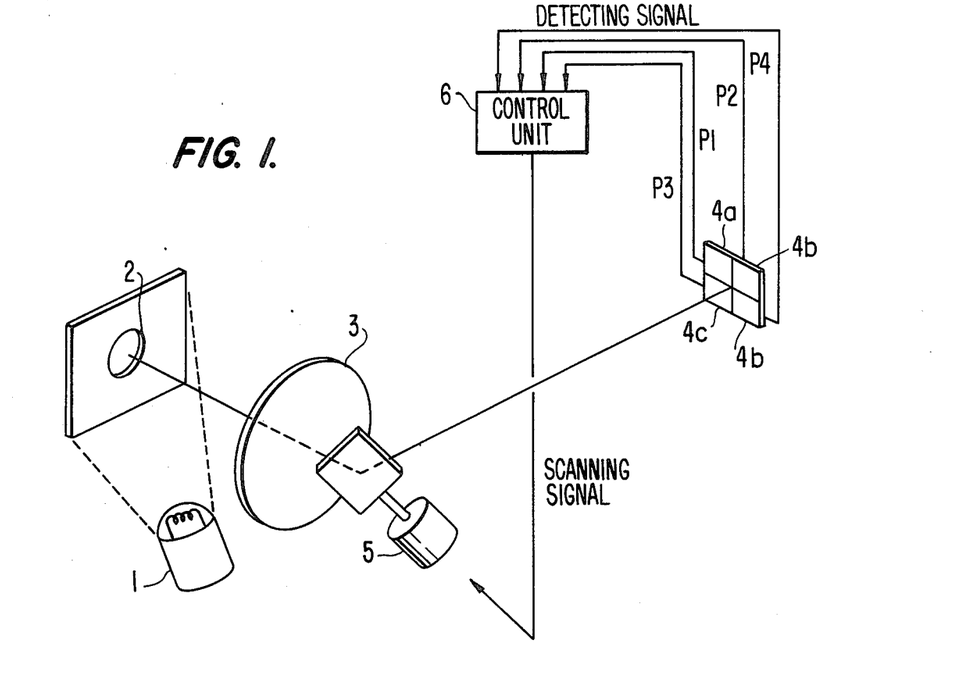
FIG. 1 is a structural view of an example of conventional position detecting apparatus.
Figure 2:
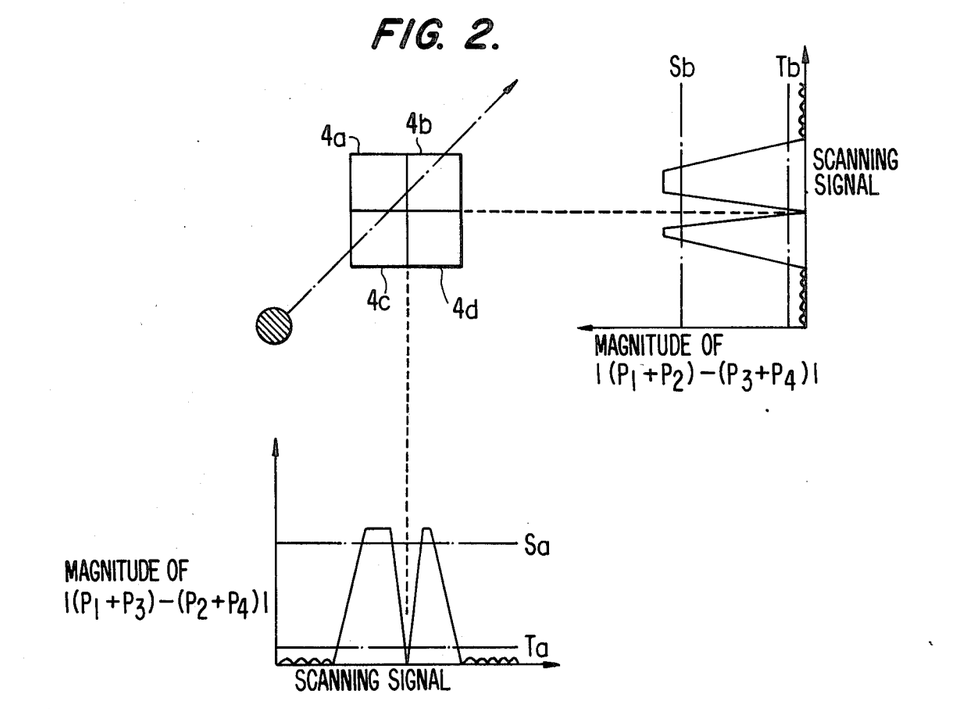
FIG. 2 shows the principle of decision at the conventional example in FIG. 1.
Figure 3:
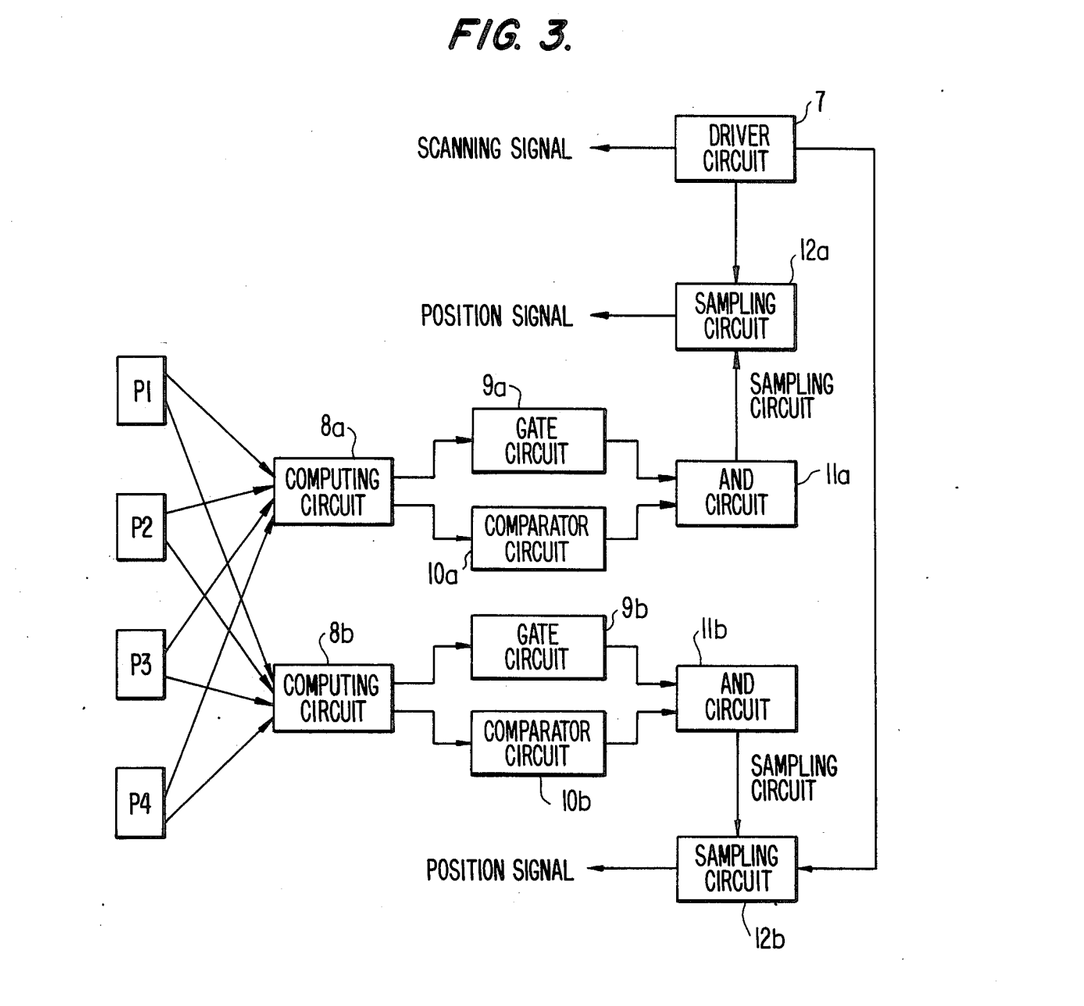
FIG. 3 is a block diagram of a control unit at the conventional example in FIG. 1, FIGS. 4-(a) and -(b) are structural views of a first embodiment of a position detecting apparatus of the invention.

Referring to FIGS. 1, 2 and 3, an object 2 to be detected lit by a light source 1 is image-formed on photoelectric converters 4a, 4b, 4c and 4d divided into four by an imaging lens 3. A galvanometer 5 as a scanning unit is disposed between the imaging lens 3 and the photoelectric converters 4a, 4b, 4c and 4d, so that the scanning signal output from a control unit 6 drives the galvanometer 5 to allow the images to move slantwise of the disposal directions of photoelectric converters 4a, 4b and 4a, 4c respectively. At first, the scanning signal is output from a driver circuit 7, the galvanometer 5 is driven, and the image of the object 2 image-formed on the photoelectric converters 4a, 4b, 4c and 4d moves slantwise in the disposal directions of photoelectric converters 4a, 4b and 4a, 4c. Detected signals $P_1$, $P_2$, $P_3$ and $P_4$ of photoelectric converters 4a, 4b, 4c and 4d are given in a computing circuit 8a and a signal $|(P_1+P_3)-(P_2+P_4)|$ is output therefrom. When the image of object 2 to be detected is given on the photoelectric converters 4a and 4c, the image is compared with $S_a$ preset a certain value to be $S_a >> 0$ and that $|(P_1+P_3)-(P_2+P_4)| > S_a$ is obtained and a gate circuit 9a outputs a signal. Next, the image of object 2 to be detected, when given to an intermediate portion between the photoelectric converters 4a to 4c and those 4b to 4d, is compared with Ta preset a certain value to be to $Ta \approx 0$, and a signal $|(P_1+P_3)-(P_2+P_4)| < Ta$ is obtained, so that a comparator circuit 10a outputs a signal. Signal outputs from the gate circuits 9a and comparator circuit 10a are given to an AND circuit 11a so that a sampling circuit 12a is given a sampling signal from the AND circuit 11a and reads the scanning signal of driver circuit 7 at that time to output a position signal in the direction of disposing the photoelectric converters 4a and 4b. Thereafter, when the image of the object 2 to be detected is given on the photoelectric converters 4b and 4d, signal $|(P_1+P_3)-(P_2+P_4)| > Sa$ is obtained, thereby outputting no signal from the gate circuit 9a. Also, an input to a computing circuit 8b is output therefrom as $|(P_1+P_2)-(P_3+P_4)|$, the output being processed as abovementioned so that a sampling circuit 12b outputs a position signal in the direction of disposing of photoelectric converters 4a and 4c.

Thus, the position detecting apparatus such that the images formed on the four-divided photoelectric converters are moved by the scanning unit slantwise in the direction of disposing each of four-divided photoelectric converters and detecting signals thereof are computed respectively to carry out the position detection, is detectable of the two-dimensional position by use of one-dimensional scanning at a time. Such apparatus, however, requires two sets of computing circuits in parallel, becomes expensive to produce, is obtainable of a large scan width, and, when the object to be detected is different in the size, should optically change the power of image, thereby having created the problem in that the apparatus lacks in high speed response and is not detectable of two-dimensional position, such as the edge and corner, of the object to be detected.

SUMMARY OF THE INVENTION

A position detecting apparatus of the invention comprises a lighting unit for lighting the object to be detected, an image-formation unit for forming image of the object to be detected, a detecting unit comprising a plurality of photoelectric converters disposed two-dimensionally and arranged on the image-formation plane for detecting brightness of the image, a scanning unit for allowing the relative position of image to the photoelectric converter to one-dimensionally move in the image-formation plane, a selecting unit for selecting a plurality of detected signals of the detecting unit, and a decision means for deciding the one- and two-dimensional positions, such as the center and corner and edge of the object by use of the detected signal of the detecting unit, selected signal of the selecting unit, and scanning signal of the scanning unit, so that a simplified processing system is designed to enable one- and two-dimensional position detections, such as the edge and corner of the object to be detected, in addition to the two-dimensional position detection, such as the center of the object to be detected, and in high speed response to a difference in the size of the object to be detected.

BEST MODE FOR CARRYING OUT THE INVENTION

Next, an embodiment of the invention will be described on the basis of the drawings.

Figure 4A:
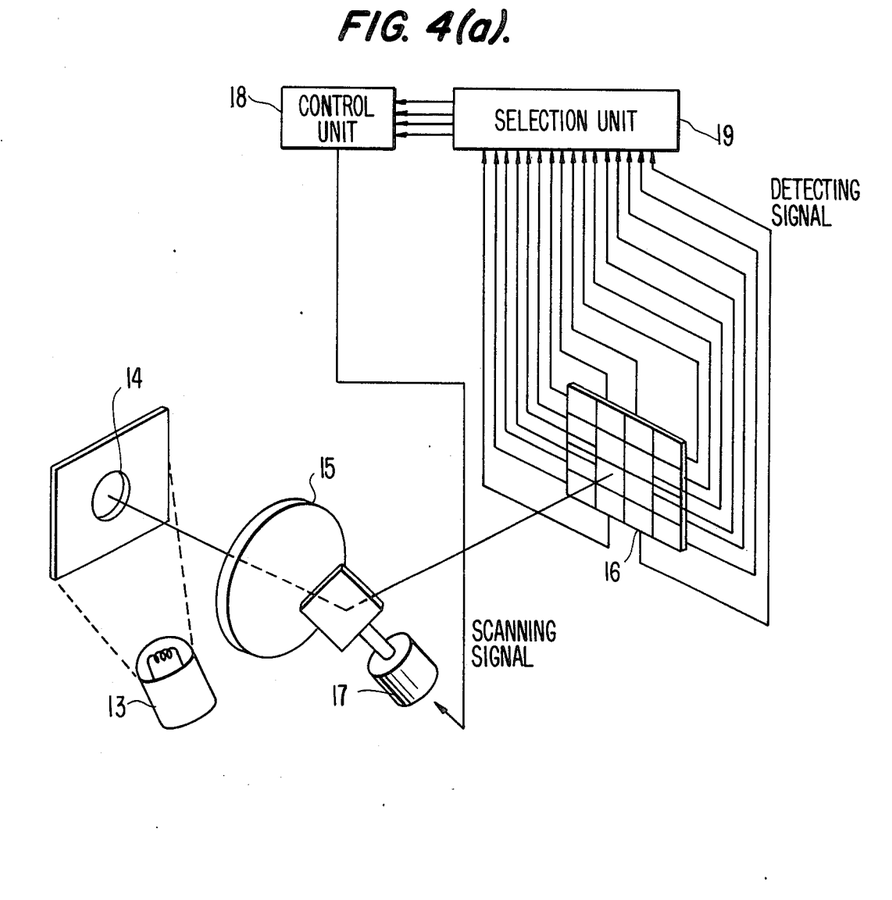
Figure 4B:
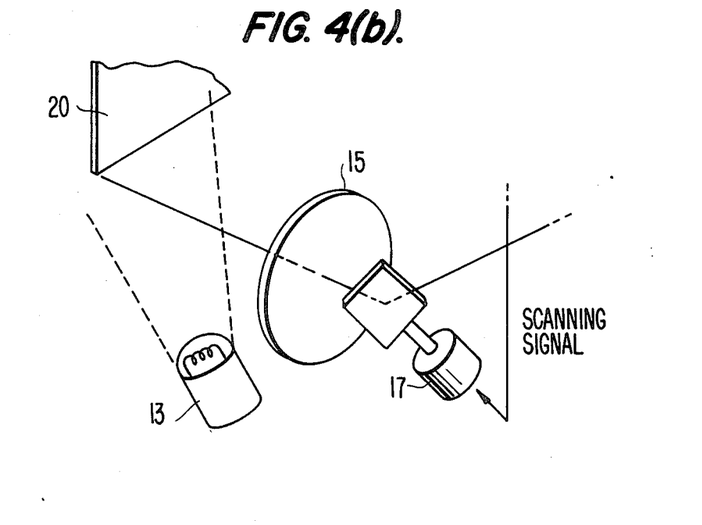
Figure 5:
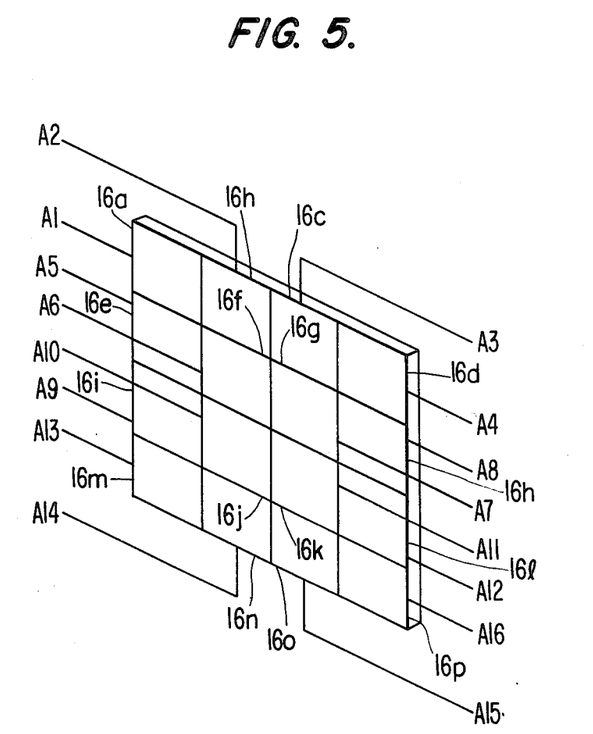
FIG. 5 is a structural view of photoelectric converters in the FIG. 4 embodiment of the invention.

In FIGS. 4–(a) and –(b), objects 14 and 20 to be detected are lit by a lighting unit 13 are imaged by an imaging lens 15 on photoelectric converters 16a, 16b . . . 16p of 4×4 pcs. disposed two-dimensionally as shown in FIG. 5. A galvanometer 17 as the scanning unit is disposed between the imaging lens 15 and the photoelectric converters 16a to 16p and driven by a scanning signal output from a control unit 18, so that the image moves slantwise in the directions of disposing the photoelectric converters 16a to 16d and 16a to 16m, and disposed so that an angle between the plane perpendicular to the optical axis of the imaging lens 15 and the swinging axis of galvanometer 17 becomes $\theta$ clockwise in FIGS. 4–(a) and –(b).

Figure 6:
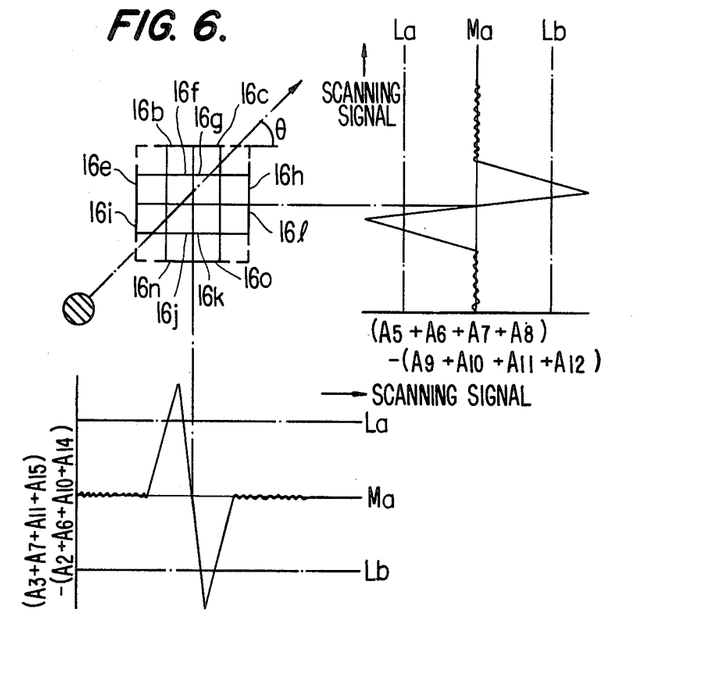
FIGS. 6, 7, 8 and 9 show the principle of decision of the first embodiment of the invention.
Figure 7:
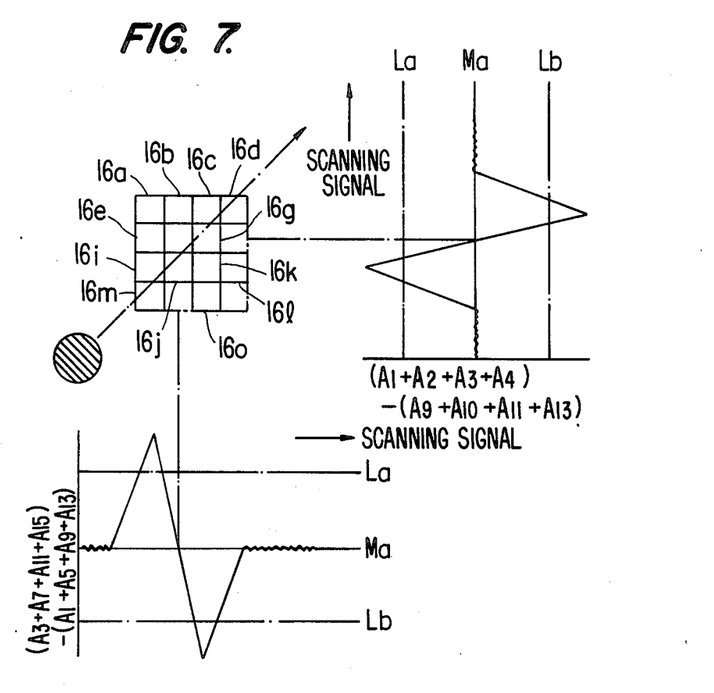
Figure 8:
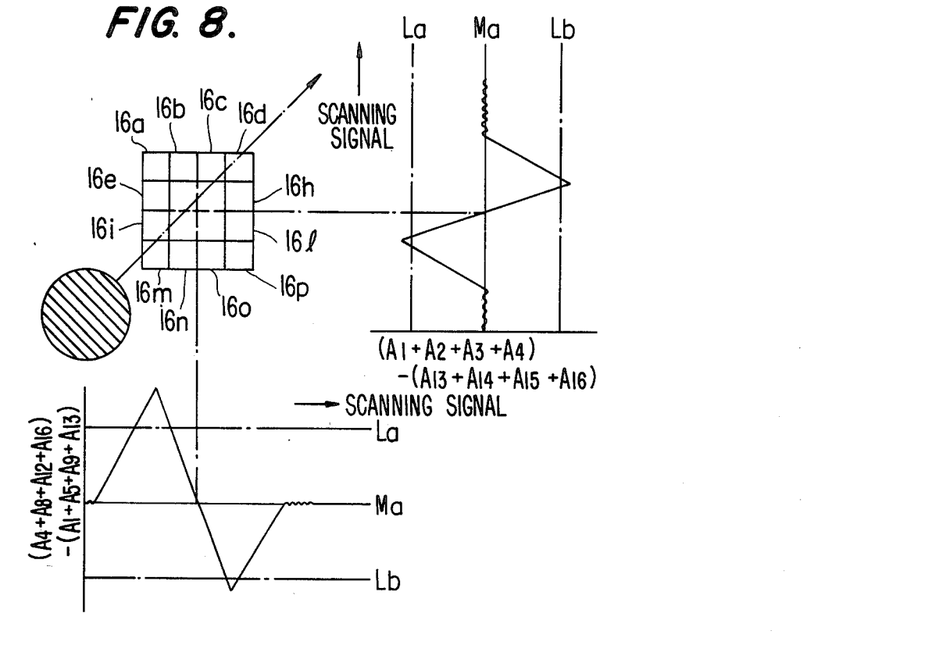

Next, explanation will be given on the principle of decision of the position of the object 14 to be detected in FIGS. 6, 7 and 8. When the size of each photoelectric converter is represented by 1×1 and that of the object to be detected by L×L, in a case of L<2l, the photoelectric converters 16b, 16c, 16e, 16f, 16g, 16h, 16i, 16j, 16k, 16l, 16n and 16o are selected, so that even when the images move slantwise in the direction of disposition, the images of object 14 to be detected are positioned within widths of 4l sin$\theta$ and 4l cos$\theta$ and inevitably intersect the center line of each interval between the photoelectric converters 16b, 16f, 16j and 16n and those 16c, 16g, 16k and 16o, or 16e, 16f, 16g and 16h and 16i, 16j, 16k and 16l. When detecting signals $A_2$, $A_3$, $A_5$, $A_6$, $A_7$, $A_8$, $A_9$, $A_{10}$, $A_{11}$, $A_{12}$, $A_{14}$ and $A_{15}$ for brightness of photoelectric converters 16b, 16c, 16e, 16f, 16g, 16i, 16j, 16k, 16l, 16n, and 16o are used to obtain signals $(A_3+A_7+A_{11}+A_{15})-(A_2+A_6+A_{10}+A_{14})$ and $(A_5+A_6+A_7+A_8)-(A_9+A_{10}+A_{11}+A_{12})$, so that when the image of object 14 is positioned at an intermediate portion between the photoelectric converters 16b, 16f, 16j and 16n and those 16c, 16g, 16k and 16o, a relational expression $(A_3+A_7+A_{11}+A_{15})-(A_2+A_6+A_{10}+A_{14})\approx$ is obtained. When the same is positioned at an intermediate portion between the photoelectric converters 16e, 16f, 16g and 16h and those 16i, 16j, 16k and 16l, $(A_5+A_6+A_7+A_8)-(A_9+A_{10}+A_{11}+A_{12})\approx 0$ is obtained. When the same is positioned in the vicinity of the above, $(A_3+A_7+A_{11}+A_{15})-(A_2+A_6+A_{10}+A_{14})>>0$, $(A_3+A_7+A_{11}+A_{15})-(A_2+A_6+A_{11}+A_{14})<<0$, $(A_5+A_6+A_7+A_8)-(A_9+A_{10}+A_{11}+A_{12})>>0$, and $(A_5+A_6+A_7+A_8)-(A_9+A_{10}+A_{11}+A_{12})<<0$ are obtained. For other than the above, $(A_3+A_7+A_{11}+A_{15})-(A_2+A_6+A_{10}+A_{14})\approx 0$ and $(A_5+A_6+A_7+A_8)-(A_9+A_{10}+A_{11}+A_{12})$ are obtained. When the size of object 14 to be detected is in relation of 1<L<3l, the photoelectric converters 16a, 16b, 16c, 16d, 16e, 16g, 16i, 16j, 16k, 16l, 16m and 16o are selected, when 2l<L<4l, those 16a, 16b, 16c, 16d, 16e, 16h, 16i, 16l, 16m, 16n, 16o and 16p are selected to obtain the result the same as in L<2l.

Figure 9:
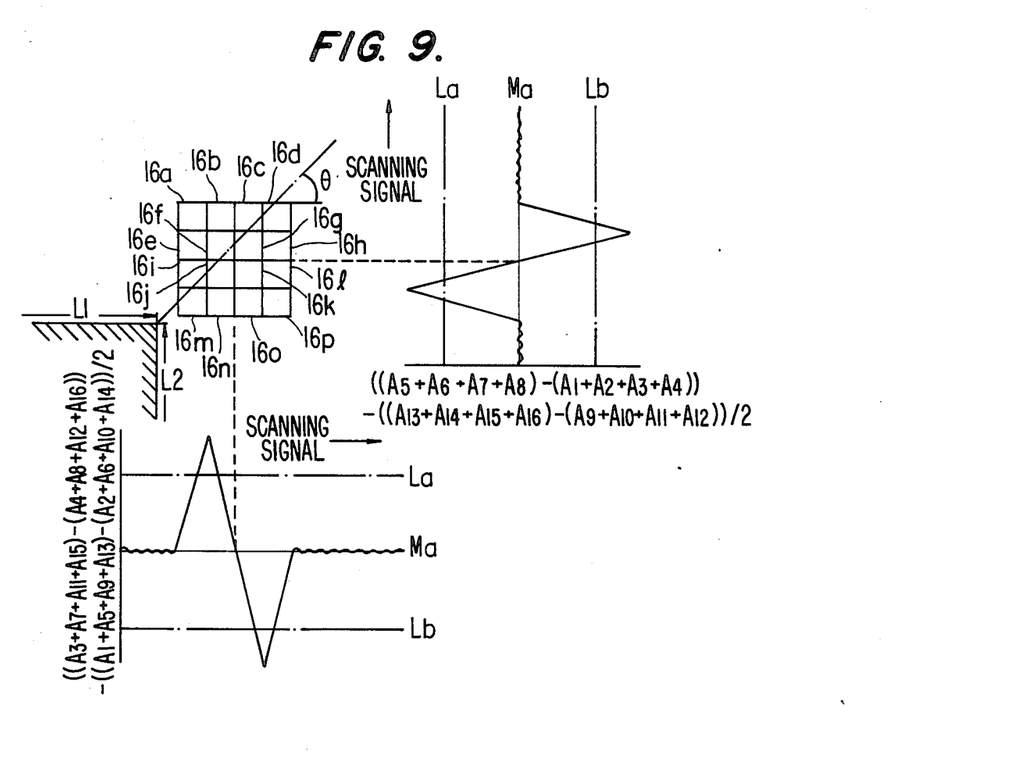

In FIG. 9, explanation is given on the principle of deciding the two-dimensional position of the corner of an object 20 to be detected. When the size of each photoelectric converter 16a, 16b . . . or 16p is represented by 1×1, that of image of the same by $L_1 \times L_2$, and a scan length by W, under the conditions of W cos$\theta \geq 3l$, W sin$\geq 3l$, $L_1 > W$ cos$\theta$, and $L_2 > W$ sin$\theta$, the detected signals $A_1$, $A_2$ . . . $A_{16}$ of photoelectric converters 16a, 16b . . . 16p are computed. When the corner of image of object 20 is positioned at an intermediate portion between the photoelectric converters 16b, 16f, 16j, and 16n, and those 16c, 16g, 16k and 16o, with respect to the disposal direction of those 16a to 16d, a signal $((A_3+A_7+A_{11}+A_{15})-(A_4+A_8+A_{12}+A_{16}))-((A_1+A_5+A_9+A_{13})-(A_2+A_6+A_{10}+A_{14}))\approx 0$ (the left side to be hereinafter represented by $R_1$) is obtained. When the corner is in the vicinity of the above, $R_1 >>0$ or $R_1 <<0$ is obtained. Other than the above, $R_1 \approx 0$ is given. Also, when the corner of object 20 is positioned at an intermediate portion between the photoelectric converters 16e, 16f, 16g and 16h and those 16i, 16j, 16k and 16l with respect to the disposal direction of those 16a to 16m, $((A_5+A_6+A_7+A_8)-(A_1+A_2+A_3+A_4))-((A_{13}+A_{14}+A_{15}+A_{16})-(A_9+A_{10}+A_{11}+A_{12}))\approx 0$ (the left side is to be hereinafter represented by $R_2$) is obtained. Also, when the corner is positioned in the vicinity of the above, $R_2 >>0$ or $R_2 <<0$ is obtained, and other than the above, $R_2 \approx 0$ is obtained.

Referring to FIGS. 6, 7, 8 and 9, the output waveforms all are similar, so that attention to be paid in that the same detecting unit and detector circuit are usuable for detecting the position of object 14 to be detected and for detecting the corner position of that 20.

Figure 10:
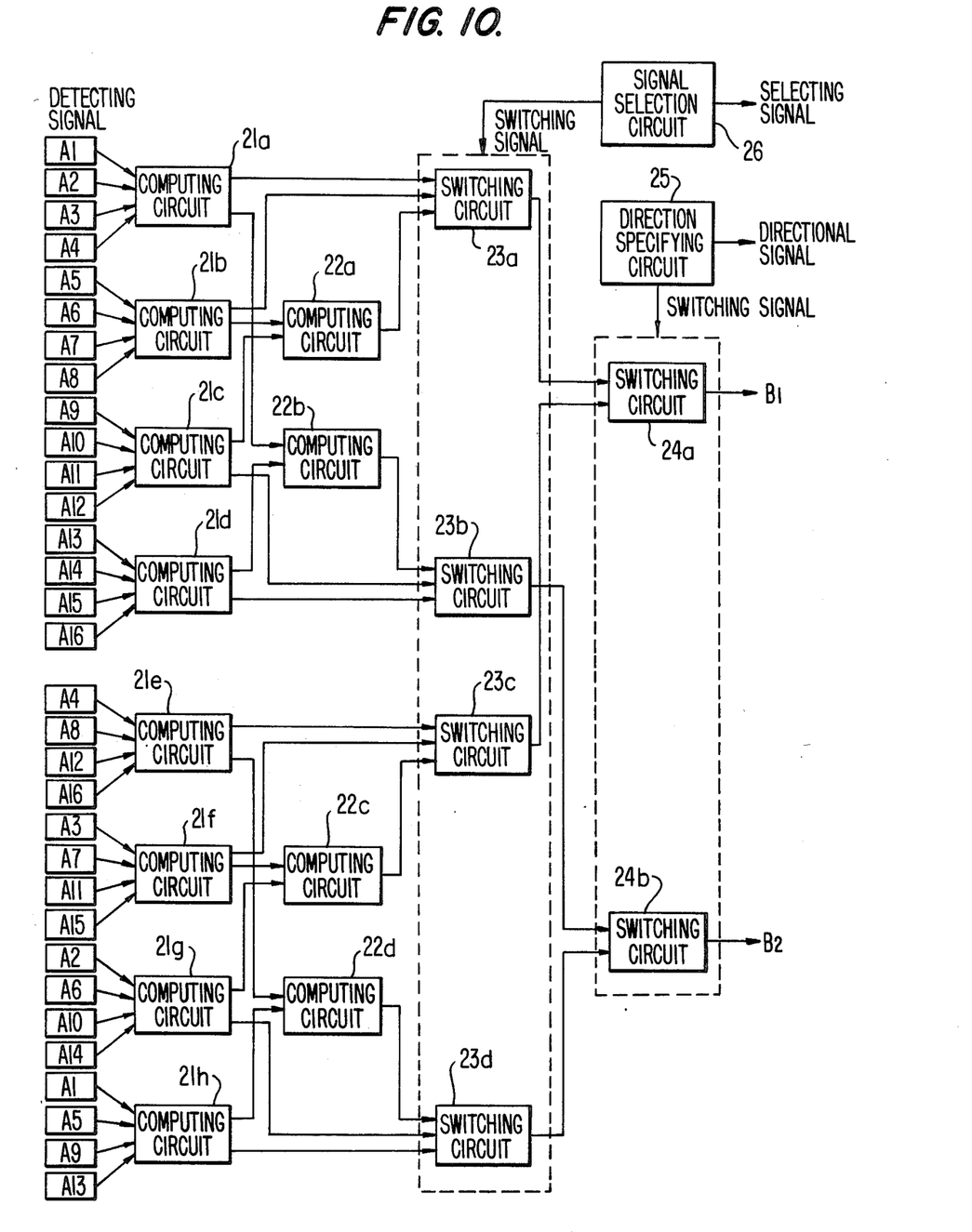
FIG. 10 is a block diagram of a selecting unit at the first embodiment.

FIG. 10 is a block diagram exemplary of a selecting unit 19, which comprises computing circuits 21a, 21b . . . 21h, those 22a, 22b, 22c and 22d, switching circuits 23a, 23b, 23c and 23d, those 24a and 24b, a direction specifying circuit 25 and a signal selecting circuit 26. The computing circuit 21a is given the detected signals $A_1$, $A_2$, $A_3$ and $A_4$ of those $A_1$ through $A_{16}$ from the photoelectric converters 16a through 16p and adds these signals $A_1$ to $A_4$ to output a signal $A_1+A_2+A_3+A_4$. The computing circuits 21b through 21h, similarly to the above, are given four detecting signals respectively to add them to thereby output signals $A_5+A_6+A_7+A_8$, $A_9+A_{10}+A_{11}+A_{12}$, $A_{13}+A_{14}+A_{15}+A_{16}$, $A_4+A_8+A_{12}+A_{16}$, $A_3+A_7+A_{11}+A_{15}$, $A_2+A_6+A_{10}+A_{14}$, and $A_1+A_5+A_9+A_{13}$ respectively. The computing circuit 22a is given the outputs $A_5+A_6+A_7+A_8$ and $A_9+A_{10}+A_{11}+A_{12}$ of computing circuits 21b and 21c, these being added and divided by 2, thereafter signal $((A_5+A_6+A_7+A_8)+(A_9+A_{10}+A_{11}+A_{12}))/2$ is output to the switching circuit 23a. The computing circuits 22b, 22c and 22d carry out computation similar to the computing circuit 22a, the computing circuit 22b being given the output signals of computing circuits 21a and 21d and outputting to the switching circuit 23b the signal $((A_1+A_2+A_3+A_4)+(A_{13}+A_{14}+A_{15}+A_{16}))/2$, the computing circuit 22c being given the output signals of computing circuits 21f and 21g and outputting to the switching circuit 23c a signal $((A_3+A_7+A_{11}+A_{15}+(A_2+A_6+A_{10}+A_{14}))/2$ and the computing circuit 22d being given the output signals of computing circuits 21e and 21h and outputting to the switching circuit 23d a signal $((A_4+A_8+A_{12}+A_{16})+(A_1+A_5+A_9+A_{13}))$. The switching circuit 23a selects one of three input signals from the computing circuits 21a, 21b and 22a according to the switching signal output from the signal selecting circuit 26, and gives the selected signal to the switching circuit 24a. The switching circuits 23b, 23c and 23d, similarly to the above, each select one of three signals from the computing circuits 21c, 21d and 22b, those 21e+21f+22c, or those 21g+21h+22d, and output the selected signals to the switching circuits 24b, 24a and 24b. The switching circuits 24a and 24b each select one of two input signals according to the switching signal output from the direction specifying circuit 25, the switching circuit 24a outputting to the control unit 18 one of signals $A_1+A_2+A_3+A_4$, $A_5+A_6+A_7+A_8$, $((A_5+A_6+A_7+A_8)+(A_9+A_{10}+A_{11}+A_{12}))/2$, $A_4+A_8+A_{12}+A_{16}$, $A_3+A_7+A_{11}+A_{15}$, and $((A_3+A_7+A_{11}+A_{15})+(A_2+A_6+A_{10}+A_{14}))/2$, the switching circuit 24b outputting to the control unit 18 one of signals $A_9+A_{10}+A_{11}+A_{12}$, $A_{13}+A_{14}+A_{15}+A_{16}$, $((A_1+A_2+A_3+A_4)+(A_{13}+A_{14}+A_{15}+A_{16}))/2$, $A_2+A_6+A_{10}+A_{14}$, $A_1+A_5+A_9+A_{13}$, and $((A_4+A_8+A_{12}+A_{16})+(A_1+A_5+A_9+A_{13}))/2$.

Figure 11:
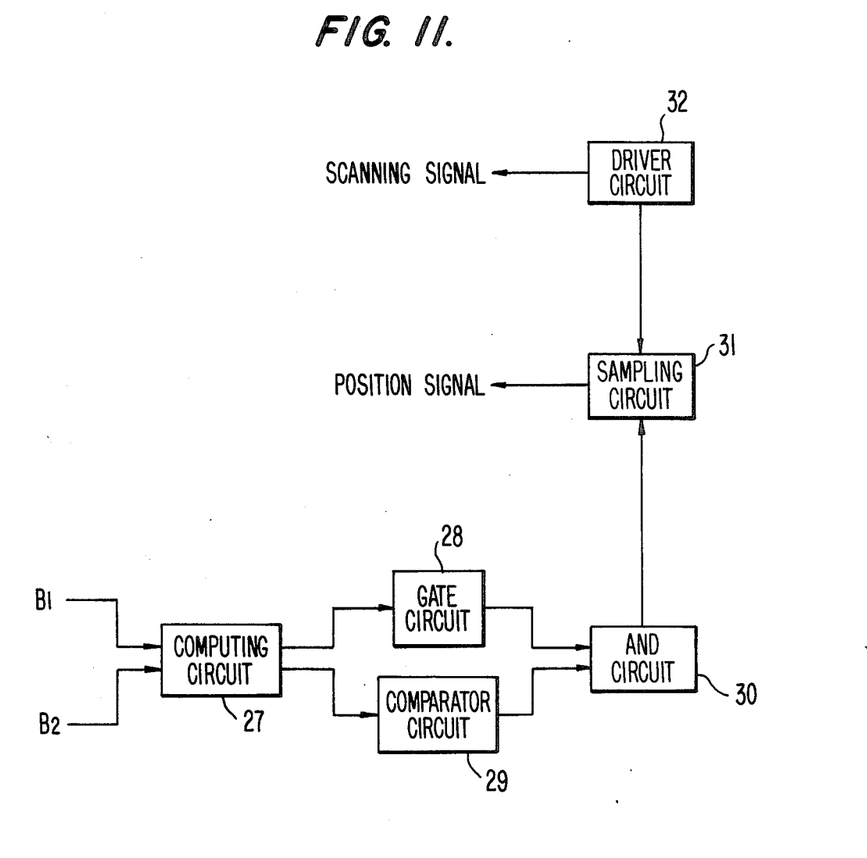
FIG. 11 is a block diagram of a control unit at the first embodiment.

FIG. 11 is a block diagram exemplary of control unit 18, which comprises a computing circuit 27, a gate circuit 28, a comparator circuit 29, an AND circuit 30, a sampling circuit 31, and a driver circuit 32. Output signals $B_1$ and $B_2$ from the selecting unit 19 are computed by the computing circuit 27 and a signal $B_1-B_2$ is output. The computing circuit 27 is connected to the gate circuit 28 and comparator circuit 29, the gate circuit 28 outputting an output signal while the input value $B_1-B_2$ exceeds a certain value and then lowers than that, the comparator circuit 29 outputting a signal when the input value $B_1-B_2$ is zero. The outputs of gate circuit 28 and comparator circuit 29 are connected to the AND circuit 30 to give a sampling signal to the sampling circuit 31 connected to the driver circuit 32 outputting scanning signals. The sampling circuit 31 reads the scanning signals of driver circuit 32 by the sampling signal and outputs a position signal.

Next, explanation will be given on operation of the embodiment of the position detecting apparatus of the invention constructed as above-mentioned.

In a case of detecting the object 14 to be detected and in condition of L 2, the direction specifying circuit 25 and signal selecting circuit 26 output switching signals respectively and the drive circuit 32 outputs scanning signals, the galvanometer 17 is driven, and the images of object 14 to be detected, formed on the photoelectric converters 16a to 16p move at an angle of $\theta$ with respect to the direction of disposing those 16a to 16d and 16a to 16m. The detecting signals $A_1$ to $A_{16}$ of photoelectric converters 12a to 16p are computed by the computing circuits 21a to 21h and those 22a to 22d. The results of computation are selected by the switching circuits 23a, 23b, 23c and 23d according to the switching signal and the switching circuits output signals $A_5+A_6+A_7+A_8$, $A_9+A_{10}+A_{11}+A_{12}$, $A_3+A_7+A_{11}+A_{15}$, and $A_2+A_6+A_{10}+A_{14}$ respectively. The switching circuits 24a and 24b select the signals $A_3+A_7+A_{11}+A_{15}$ and $A_2+A_6+A_{10}+A_{14}$ according to the switching signal output from the direction specifying circuit 25 and output the selected signals to the computing circuit 27, which outputs the signal $(A_3+A_7+A_{11}+A_{15})-(A_2+A_6+A_{10}+A_{14})$. When the images of object 14 to be detected come on the photoelectric converters 16b, 16f, 16j and 16n, the images are compared with a certain value La preset to be $La>>0$ and a relation of $(A_3+A_7+A_{11}+A_{15})-(A_2+A_6+A_{10}+A_{14})>La$ is obtained, thereby outputting a signal from the gate circuit 28. Next, the image of object 14 to be detected, when coming in an intermediate portion between the photoelectric converters 16b, 16f, 16j and 16n and those 16c, 16g, 16k and 16o, is compared with a value Ma preset to be $Ma\approx 0$ and $(A_3+A_7+A_{11}+A_{15})-(A_2+A_6+A_{10}+A_{14})=Ma$ is obtained, the comparator circuit 29 outputting a signal. The output signals from the gate circuit 28 and comparator circuit 29 allow the AND circuit 30 to output a sampling signal to the sampling circuit 31, so that the sampling circuit 31 reads the scanning signals of driver circuit 32 at that time to thereby output the position signal in the directions of disposing the photoelectric converters 16a to 16d. Thereafter, the images of object 14, when given on the photoelectric converters 16c, 16g, 16k and 16o, are compared with a certain value Lb preset to be $Lb<<0$ and $(A_3+A_7+A_{11}+A_{15})-(A_2+A_6+A_{10}+A_{14})<Ib$ is obtained, so that the gate circuit 28 includes no signal.

Then, when the driver circuit 32 finishes in one cycle period, the switching signal of direction specifying circuit 25 changes and the switching circuits 24a and 24b selectively output signals $A_5+A_6+A_7+A_8$ and $A_9+A_{10}+A_{11}+A_{12}$ respectively, and thereafter are processed, as the same as the abovementioned, by the computing circuit 27, gate circuit 28, comparator circuits 29 and AND circuit 30, the sampling circuit 31 reading the scanning signal of driver circuit 32 at that time so as to output the position signal in the direction of disposing the photoelectric converters 16a to 16m. Also, an object in condition of $1<L<31$ and $21<L<41$ is detectable as the same as the abovementioned, explanation on which is omitted herein.

Next, in a case of detecting the object 20 to be detected, the direction specifying circuit 25 and signal selecting circuit 26 output the switching signals respectively, and the driver circuit 32 outputs the scanning signal to thereby drive the galvanometer 17, so that the images of object 20 to be detected, image-formed on the photoelectric converters 16a to 16p move slantwise at an angle of $\theta$ with respect to the directions of disposing the photoelectric converters 16a to 16d and those 16a to 16m. The detected signals $A_1$ to $A_{16}$ are computed by the computing circuits 21a to 21h and 22a to 22d, the results of which are selected by the switching circuits 23a, 23b, 23c and 23d according to the switching signal output, whereby the signals $((A_5+A_6+A_7+A_8)+(A_9+A_{10}+A_{11}+A_{12}))/2$, $((A_1+A_2+A_3+A_4)+(A_{13}+A_{14}+A_{15}+A_{16}))/2$, $((A_3+A_7+A_{11}+A_{15})+(A_2+A_6+A_{10}+A_{14}))/2$, and $((A_4+A_8+A_{12}+A_{16})+(A_1+A_5+A_9+A_{13}))/2$ are output respectively. The switching circuits 24a and 24b select the signals $((A_3+A_7+A_{11}+A_{15})+(A_2+A_6+A_{10}+A_{14}))/2$ and $(A_4+A_8+A_{12}+A_{16})+(A_1+A_5+A_9+A_{13}))/2$ on accordance with the switching signal output from the direction specifying circuit 25 respectively and output the selected signals to the computing circuit 27, so that a signal $(((A_3+A_7+A_{11}+A_{15})+(A_2+A_6+A_{10}+A_{14})-((A_4+A_8+A_{12}+A_{16})+(A_1+A_5+A_9+A_{13})))/2$ = $(((A_3+A_7+A_{11}+A_{15})-(A_4+A_8+A_{12}+A_{16}))-((A_1+A_5+A_9+A_{13})-(A_2+A_6+A_{10}+A_{14})))/2$ is output from the computing circuit 27.

Then, the output signal therefrom passes through the gate circuit 28, comparator circuit 29, AND circuit 30 and sampling circuit 31 and reads the scanning signals at that time and thereafter the position signal in the direction of disposing the photoelectric converters is output, the process of which is the same as the position detection of the object 14 whereby description in detail is omitted herein. Next, when the scanning signal of driver circuit 32 finishes in one cycle period, the switching signal of direction specifying circuit 25 changes and the switching circuits 24a and 24b selectively output signals $((A_5+A_6+A_7+A_8)+(A_9+A_{10}+A_{11}+A_{12}))/2$ and $((A_1+A_2+A_3+A_4)+(A_{13}+A_{14}+A_{15}+A_{16}))/2$ respectively. Then, the output signals, as the same as the abovementioned, are processed by the computing circuit 27, gate circuit 28, comparator circuit 29 and AND circuit 30, the sampling circuit 31 reading the scanning signals of driver circuit 32 to output the position signal in the direction of disposing the photoelectric converters 16a to 16m.

As seen from the above, this embodiment selects the detected signals by the photoelectric converters of 4×4 pcs. disposed two-dimensionally so that the signals are subjected to computing process, whereby the same detecting apparatus and the same detecting circuit are used to enable detection of the two-dimensional position of the center of the object to be detected and the one- and two-dimensional positions of the edge and corner of the object in response to a difference in the size of the object, the detection being performable without hindering the characteristic of using the simplified processing system. In this embodiment, the detecting unit comprising the photoelectric converters of 4×4 pcs. disposed two-dimensionally, and the selecting unit for selecting a plurality of detecting signals of the detecting unit, are used to carry out the position detection in response to a difference in the size of the object to be detected. Alternatively, a detecting unit comprising photoelectric converters of 2×2 pcs. diposed two-dimensionally, and a plurality of limit units for limiting the light receiving surfaces at the photoelectric converters, may be used, thereby obtaining the same results as the above. Next, such construction will be explanatory as a second embodiment in accordance with FIGS. 12, 13, 14, 15, 16, 17 and 18.

Figure 12:
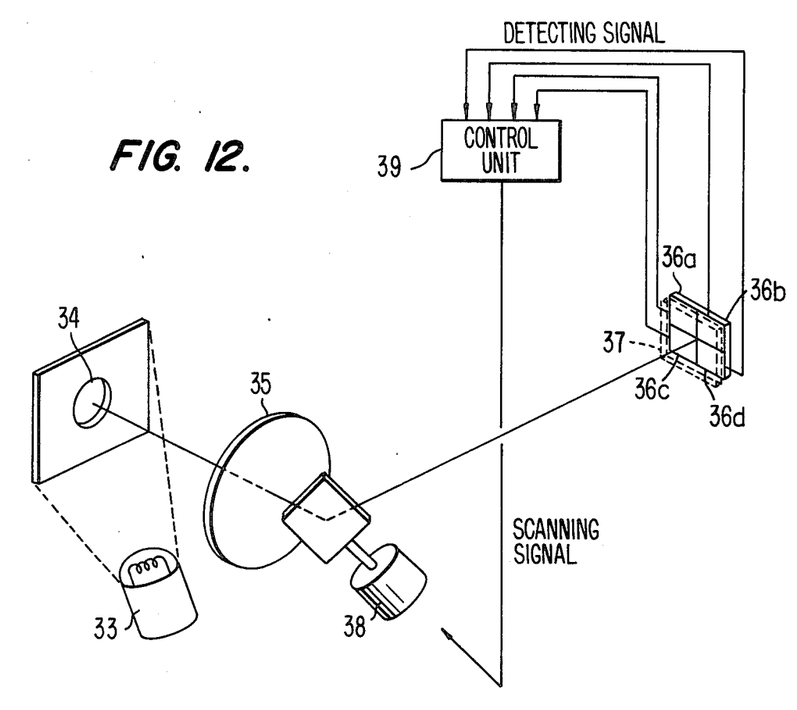
FIG. 12 is a structural view of a second embodiment of the position detecting apparatus of the invention.
Figure 13:
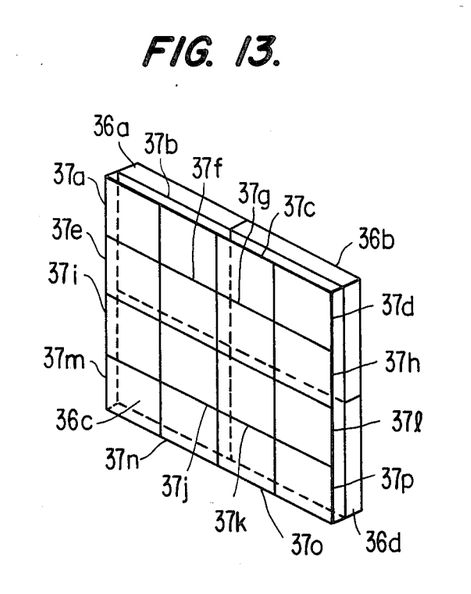
FIG. 13 is a structural view of a detecting unit at the second embodiment in FIG. 12, FIGS. 14, 15, 16 and 17 show the principle of decision at the second embodiment of the invention.
Figure 14:
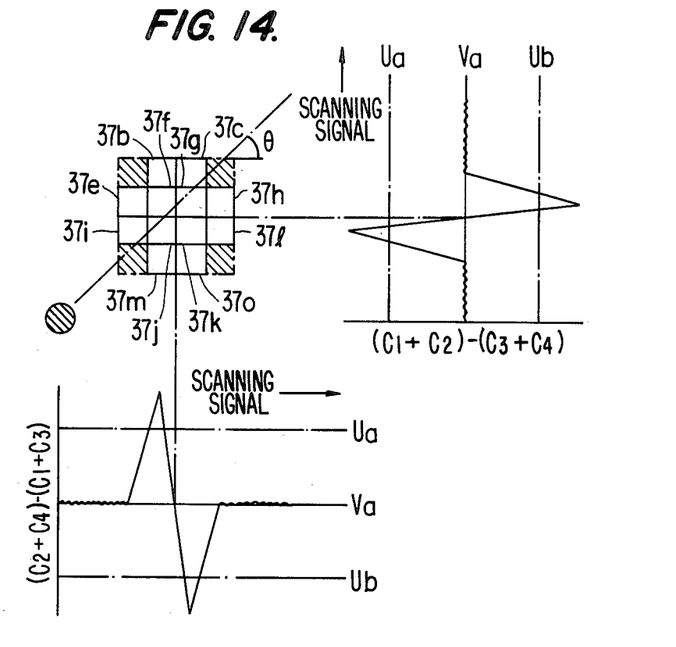
Figure 15:
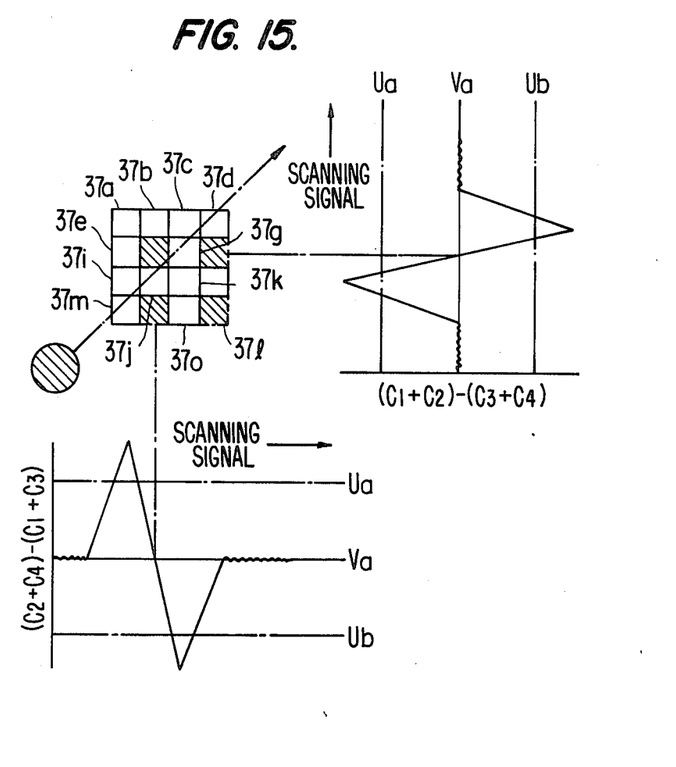
Figure 16:
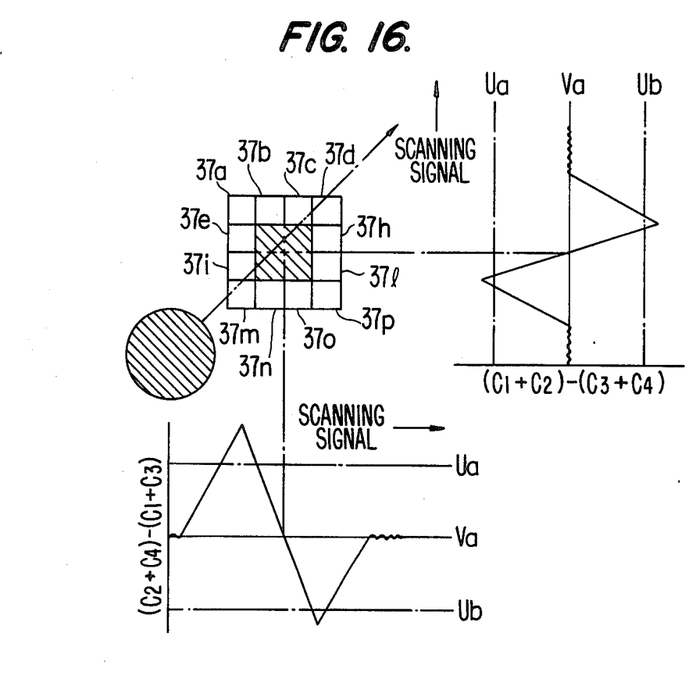
Figure 17:
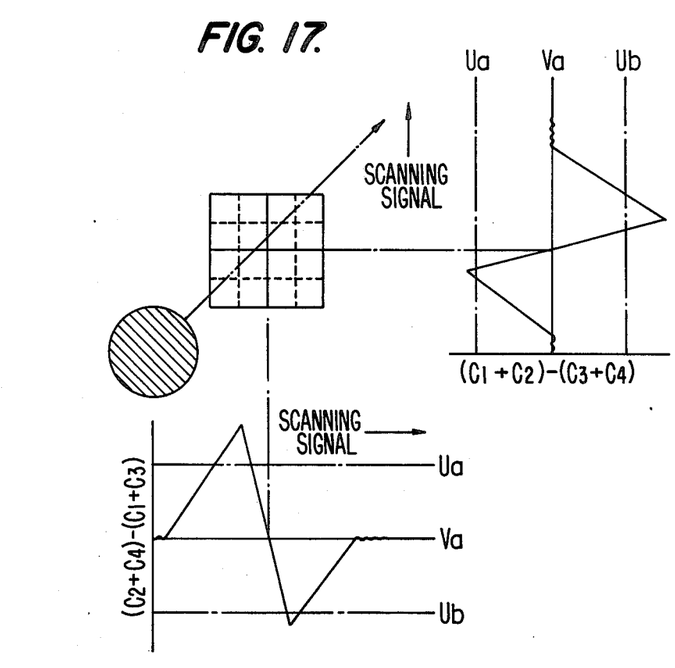

Referring to FIG. 12, an object 34 to be detected is lit by a lighting unit 33 is image-formed by an imaging lens 35 on four photoelectric converters 36a, 36b, 36c and 36d disposed two-dimensionally. On the light receiving surfaces thereof are disposed a limit unit 37 for limiting the size of light receiving surface, which is driven by a driving signal output from the control unit 39. The limit unit 37 utilizes the electro-optical effect and comprises sixteen liquid crystals of 37a, 37b, 37p and coincides in the disposal direction with the photoelectric converters 36a, 36b, 36c and 36d so that the center line of limit units 37b, 37f, 37j and 37n and those 37c, 37g, 37k and 37o coincides with that of photoelectric converters 36a to 36c and those 36b to 36d, and the center line of limit units 37e, 37f, 37g and 37h and those 37i, 37j, 37k and 37l coincides with that of photoelectric converters 36a and 36b and those 36c and 36d, the limit units 37a to 37p being energized to transmit the light and cut off to shade it. A galvanometer 38 as the scan unit is disposed between the imaging lens 35 and the limit unit 37 and driven by the scanning signal output from the control unit 39, so that the image moves slantwise with respect to the directions of disposing the photoelectric converters 36a to 36d and 36a to 36c, the galvanometer 38 being disposed so that an angle between the surface of imaging lens 35 perpendicular to the optical axis and the axis of swinging at the galvanometer 38 becomes clockwise $\theta$ as shown in FIG. 14.

Referring to FIGS. 14, 15, 16 and 17, explanation will be given on the principle of deciding the position of object 34 to be detected. When the size of each limit unit 37a, 37b . . . , or 37p is represented by 1×1, that of each photoelectric converter 36a to 36d by 21×21, and that of object 34 to be detected by L×L, in a case where the size of object 34 is in condition of L<21, the limit units 37b, 37c, 37f, 37g, 37j, 37k, 37n and 37o and those 37e, 37f, 37g, 37h, 37i, 37j, 37k and 37l are energized, whereby the image of object 34 positioned within widths of 4l sin$\theta$ and 4l cos$\theta$, even when moving slantwise in the aforesaid disposal directions, always intersects the center line between the limit units 37b, 37f, 37j and 37n and those 37c, 37g, 37k and 37o and that between the limit units 37e, 37f, 37g and 37h and those 37i, 37j, 37k and 37l. Hence, from detecting signals $C_1$, $C_2$, $C_3$ and $C_4$ for the brightness of the image on each photoelectric converter 36a, 36b, 36c or 36d, signals $(C_2+C_4)-(C_1+C_3)$ and $(C_1+C_2)-(C_3+C_4)$ are obtained, so that when the image of object 34 is positioned at an intermediate portion between the limit units 37b, 37f, 37j and 37n and those 37c, 37g, 37k and 37o, a relational expression $(C_2+C_4)-(C_1+C_3) \approx 0$ is obtained. When the same is positioned between the limit units 37e, 37f, 37g and 37h and those 37i, 37j, 37k and 37l, that $(C_1+C_2)-(C_3+C_4) \approx 0$ is obtained, and when positioned in the vicinity of the above limit units, relational expressions $(C_2+C_4)-(C_1+C_3) > > 0$, $(C_2+C_4)-(C_1+C_3) < < 0$, $(C_1+C_2)-(C_3+C_4) > > 0$ and $(C_1+C_2)-(C_3+C_4) < < 0$ are obtained. Other than the above, those $(C_2+C_4)-(C_1+C_3) \approx 0$ and $(C_1+C_2)-(C_3+C_4) \approx 0$ are obtained. Also, when the size of object 34 to be detected is in condition of 1<L<3l, the limit units 37a, 37c, 37e, 37g, 37i, 37k, 37m and 37o and those 37a, 37b, 37c, 37d, 37i, 37j, 37k and 37l are energized. When 21<L<4l, the limit units 37a, 37d, 37e, 37h, 37i, 37l, 37m and 37p and those 37a, 37b, 37c, 37d, 37m, 37n, 37o and 37p are energized, thereby obtaining the same results as abovementioned, which is to be noticed.

Figure 18:
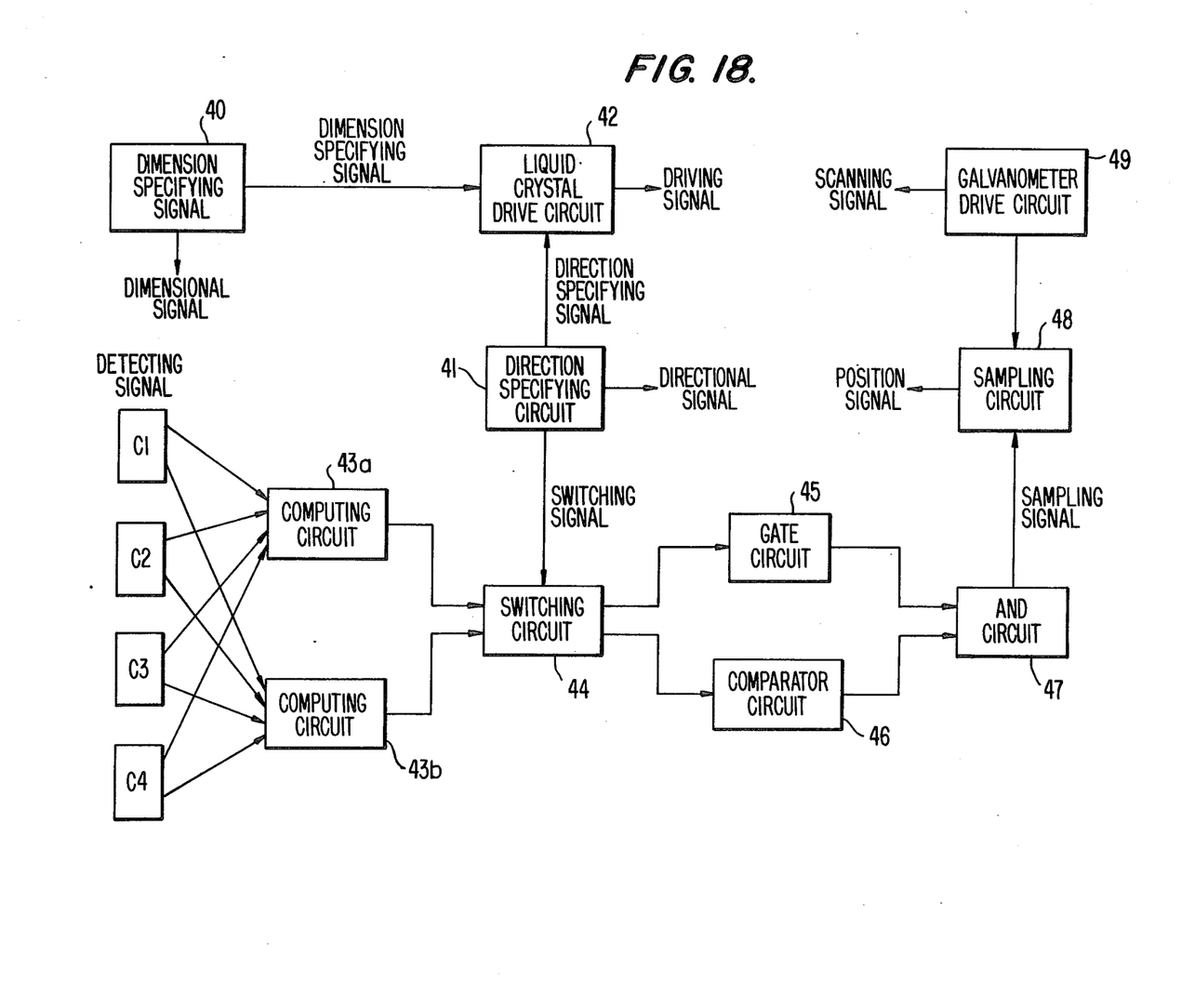
FIG. 18 is a block diagram of a control unit at the second embodiment.

FIG. 18 is a structural view exemplary of the control unit 39, which comprises a dimension specifying circuit 40, a direction specifying circuit 41, a liquid crystal driver circuit 42, computing circuits 43a and 43b, a switching circuit 44, a gate circuit 45, a comparator circuit 46, an AND circuit 47, a sampling circuit 48 and a galvanometer driver circuit 49. When the dimension specifying circuit 40 outputs a dimension specifying signal and the direction specifying circuit 41 outputs a direction specifying signal and a switching signal, the liquid crystal driver circuit 42 outputs a driving signal to one of the sets of limit units 37b, 37c, 37f, 37g, 37j, 37k, 37n and 37o; 37e 37f, 37h, 37i, 37j, 37 k and 37l; 37a, 37c, 37e, 37g, 37i, 37k, 37m, and 37o; 37a, 37 b, 37c, 37d, 37i, 37j, 37k and 37l; 37a, 37d, 37e, 37h, 37i, 37l, 37m and 37p; and 37a, 37b, 37c, 37d, 37m, 37o and 37p, the switching circuit 44 outputting one of outputs of computing circuits 43a and 43b to the gate circuit 45 and comparator circuit 46. The detecting signals $C_1$, $C_2$, $C_3$ and $C_4$ of photoelectric converters 36a, 36b, 36c and 36d are computed by the computing circuits 43a and 43b to be signals $(C_2+C_4)-(C_1+C_3)$ and $(C_1+C_2)-(C_3+C_4)$ respectively. The gate circuit 45 outputs the signal for a period from the input value exceeding a certain value to that lower than that, the comparator circuit 46 delivering an output signal when the input value becomes zero.

The outputs of gate circuit 45 and comparator circuit 46 are connected to the AND circuit 47 to give a sampling signal to the sampling circuit 48 connected to the galvanometer driver circuit 49 outputting the scanning signal, the sampling circuit 48 reading from the sampling signal the scanning signal of galvanometer driver circuit 49 and outputting a position signal.

Next, explanation will be given on operation of the second embodiment of the position detecting apparatus.

In a case where the object to be detected and in condition of $L<2l$ is detected, at first, the dimension specifying circuit 40 outputs the dimension specifying signal, the direction specifying circuit 41 outputs the direction specifying signal and switching signal, the liquid crystal driver circuit 42 outputs the driving signal to the limit unit 37, the limit units 37b, 37c, 37f, 37g, 37j, 37k, 37n, and 37o are energized to be in light transmission condition, and the switching circuit 44 receives the signal $(C_2+C_4)-(C_1+C_3)$ of computing circuit 43a for outputting the detecting signals $C_1$, $C_2$, $C_3$ and $C_4$ of photoelectric converters 36a, 36b, 36c and 36d and outputs said signal to the gate circuit 45 and comparator circuit 46. Simultaneously, the galvanometer driver circuit 49 outputs the scanning signal to drive the galvanometer 38 so that the object 34 to be detected is image-formed on the photoelectric converters 36a, 36b, 36c and 36d, the images thereon moving at an angle of $\theta$ with respect to the directions of disposing the photoelectric converters 36a and 36b, and 36a and 36c. The image of object 34, when given on the limit units 37b, 37f, 37j and 37n, is compared with Ua preset a certain value so as to be $Ua>>0$ and then a relational expression $(C_2+C_4)-(C_1+C_3)>Ua$ is obtained, thereby outputting a signal from the gate circuit 45. Next, the image of object 34, when given on an intermediate portion between the limit units 37b, 37f, 37j and 37n and those 37c, 37g, 37k and 37o, is compared with Va preset a certain value to be $Va\approx 0$ and $(C_2+C_4)-(C_1+C_3)=Va$ is obtained, the comparator circuit 46 outputting a signal. The AND circuit 47 outputs a sampling signal from the signal outputs of gate circuit 45 and comparator circuit 46 to the sampling circuit 48. The sampling circuit 48 at that time reads the scanning signal of galvanometer driver circuit 49 and outputs a position signal in the direction of disposing photoelectric converters 36a and 36b.

Thereafter, the image of object 34, when coming on the limit units 37c, 37g, 37k and 37o, is compared with Ub preset a certain value to be $Ub<<0$ to obtain the relation: $(C_2+C_4)-(C_1+C_3)<Ub$, whereby the gate circuit 45 outputs no signal. Next, when the scanning signal of galvanometer driver circuit 49, the direction specifying signal and switching signal of direction specifying circuit 41 change and the limit units 37e, 37f, 37g, 37h, 37i, 37j, 37k and 37l are energized to be put in a light transmission condition, the switching circuit 44 receiving the signal $(C_1+C_2)-(C_3+C_4)$ of computing circuit 43b and outputting them to the gate circuit 45 and comparator circuit 46. Simultaneously, the galvanometer driver circuit 49 outputs the scanning signal. The signal $(C_1+C_2)-(C_3+C_4)$ as the same as abovementioned is processed by the gate circuit 45, comparator circuit 46 and AND circuit 47, and the sampling circuit 48 reads the scanning signal of galvanometer driver circuit 49 at that time so as to output the position signal in the direction of disposing the photoelectric converters 36a to 36c.

In a case of detecting the object to be detected in the conditions of $1<L<3l$ and $2l<L<4l$, the operation is the same as the abovementioned, thereby omitting explanation thereof.

As seen from the above, the second embodiment individually drives sixteen limit units disposed to limit the light receiving surfaces of four photoelectric converters disposed two-dimensionally, whereby the one-dimensionally scanning unit twice scans the object to enable the two-dimensional position detection thereof in response to a difference in the size of the object without hindering the characteristic of the use of simplified processing system.

Figure 19:
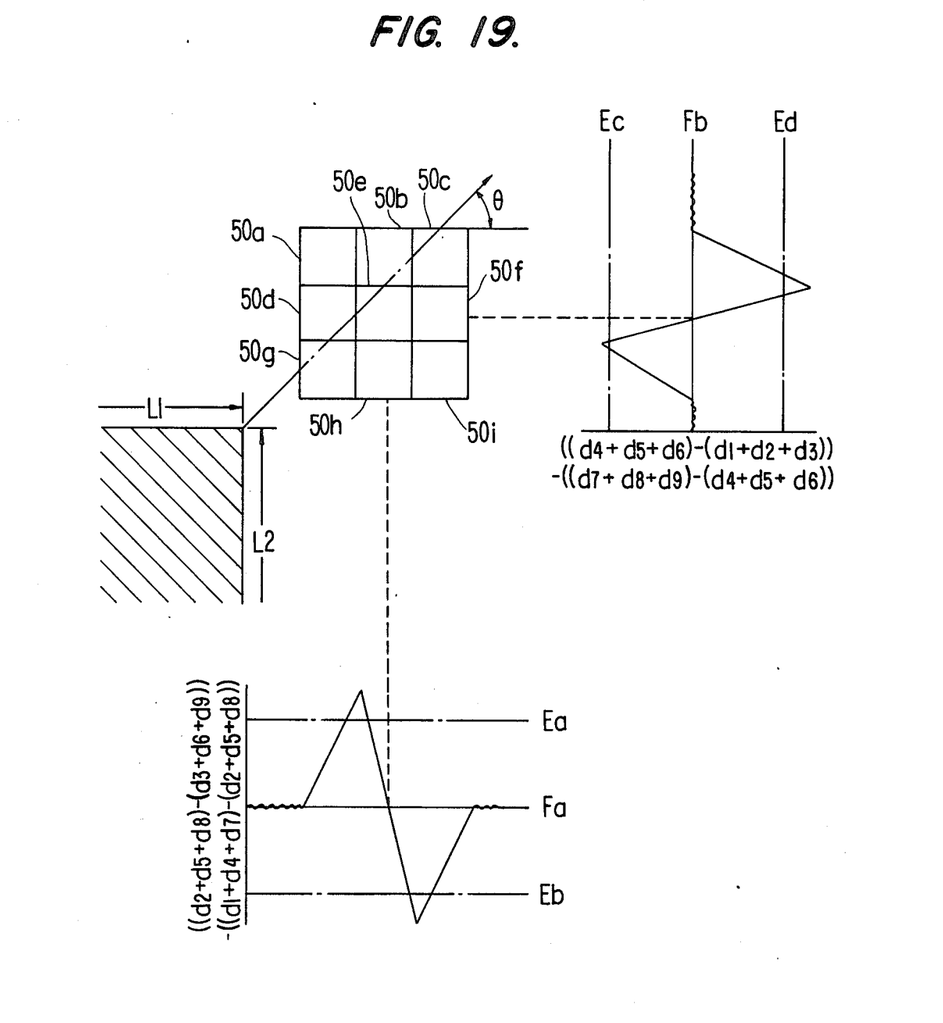
FIG. 19 shows the principle of decision at a third embodiment of the invention.

Next, a third embodiment of the invention, in which the photoelectric converter 16 shown in FIG. 4 is replaced by photoelectric converters 50 of $3\times3$ pcs. disposed two-dimensionally as shown in FIG. 19, will be described. In a case where the third embodiment detects the two-dimensional position of the corner of the object 20 to be detected, when the image of object 20 is driven by the galvanometer 17 and moves at an angle of $\theta$ with respect to the directions of disposing the photoelectric converters 50a to 50c and 50a to 50g, the detected signals $d_1$ to $d_9$ of photoelectric converters 50a to 50i are selected respectively, so that when the position in the proposal direction of photoelectric converters 50a to 50c, a signal $((d_2+d_5+d_8)-(d_3+d_6+d_9))-((d_1+d_4+d_7)-(d_2+d_5+d_8))$ is obtained and when the position in the disposal direction of those 50a to 50g is detected, a signal $((d_4+d_5+d_6)-(d_1+d_2+d_3))-((d_7+d_8+d_9)-(d_4+d_5+d_6))$ is obtained, thereby enabling the two-dimensional position detection by a recognizing method the same as the aforesaid embodiment.

As seen from the above, the third embodiment the images formed on the photoelectric converters of $3\times3$ pcs. disposed two-dimensionally are moved by the one-dimensionally scanning unit and the detected signals from the nine photoelectric converters are computing-processed, thereby enabling the corner of the object to be detected by the simplified processing system.

In addition, the photoelectric converters of $4\times4$ pcs. disposed two-dimensionally in the first embodiment, those of $2\times2$ pcs. disposed two-dimensionally in the second embodiment, and those of $3\times3$ pcs. disposed similarly to the above in the third embodiment, may of course be replaced by the converters different from the above in the number of disposal rows, thereby obtaining the same results as the above.

Also, the sixteen limit units in the second embodiment may alternatively be replaced by those different in the number of disposal rows, thereby of course obtaining the same results as the above. Alternatively, the inside limit units may all be made transparent.

INDUSTRIAL APPLICABILITY

This invention moves by the scanning unit the images formed on a plurality of photoelectric converters disposed two-dimensionally, slantwise in the disposal direction of the respective photoelectric converters and the selecting unit selects the detected signal of each photoelectric converter and computing-processes the detected signals, so that the position detecting apparatus is realizable which is superior in that the object to be detected is detectable of the one- and two-dimensional position detections not only for the center of the object but also for the corner and edge thereof without hingering the characteristic of carrying out the position detection by use of the simplified system and that the position detection in a wide range is performable in response to a difference in the size of the object.

What is claimed is:

1. A position detecting apparatus comprising: a lighting unit for lighting an object to be detected; an image-formation unit for imaging said object to be detected; a detecting unit comprising a plurality of photoelectric converters disposed on an image-formation plane to detect brightness of said image and disposed two-dimensionally; a scanning unit for allowing the relative position of each of said photoelectric converters with respect to said image to move one-directionally in said image-formation plane; a selecting unit for selecting a plurality of detected signals from said detecting unit, and a decision means for determining the one- and two-dimensional positions of the center, corner and edge of said object in accordance with a detecting signal from said detecting unit, a selecting signal from said selecting unit and a scanning signal from said scanning unit.

2. A position detecting apparatus as set forth in claim 1, wherein the center of said object to be detected is detectable in response to a difference in the size of said object to be detected, by how to adopt said selecting signal at said selecting unit.

3. A position detecting apparatus as set forth in claim 1, wherein a one-dimensional computing process circuit and a one-dimensionally scanning unit for twice scanning detect the two-dimensional positions of the center and corner of said object to be detected.

4. A position detecting apparatus as set forth in claim 1, wherein images of said object to be detected, which are image-formed on the plurality of said photoelectric converters disposed two-dimensionally, are moved slantwise in a direction of disposing each of said photoelectric converters through one-dimensional scanning, whereby said object to be detected is detectable by means of the two-dimensional positions of the center and corner of said object.

5. A position detecting apparatus as set forth in claim 1, wherein said decision means determines the position of the center of said object to be detected, even when the size thereof changes, and with slight variations in the detection accuracy by how to adopt said selecting signal at said selecting unit.

6. A position detecting apparatus as set forth in claim 1, wherein the plurality of detected signals from said detecting unit are selected to enable position detection of the edge and corner of said object to be detected by use of the same method used to detect the center of said object to be detected.

7. A position detecting apparatus as set forth in claim 6, wherein the detected signals of said plurality of photoelectric converters disposed two-dimensionally are subtracted from each other to enable the position detection of the edge and corner of said object to be detected.

8. A position detecting apparatus as set forth in claim 1, wherein said selecting unit comprises a plurality of limit units for limiting the light receiving surfaces of said photoelectric converters respectively, thereby enabling detection of the center of said object to be detected in response to a difference in the size of said object to be detected.

* * * * *